United States Patent
Hoelzl et al.

(10) Patent No.: US 8,629,193 B2
(45) Date of Patent: Jan. 14, 2014

(54) METHOD FOR PRODUCING POROUS SILICON MOLDED BODIES

(75) Inventors: Manfred Hoelzl, Chattanooga, TN (US); Frauke Kirschbaum, Munich (DE); Robert Maurer, Munich (DE); Juergen Pfeiffer, Mehring (DE); Konrad Alfons Wierer, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/576,336

(22) PCT Filed: Jan. 19, 2011

(86) PCT No.: PCT/EP2011/050659
§ 371 (c)(1),
(2), (4) Date: Jul. 31, 2012

(87) PCT Pub. No.: WO2011/095393
PCT Pub. Date: Aug. 11, 2011

(65) Prior Publication Data
US 2012/0296062 A1    Nov. 22, 2012

(30) Foreign Application Priority Data
Feb. 2, 2010  (DE) .................. 10 2010 001 482

(51) Int. Cl.
*C08J 9/28* (2006.01)
(52) U.S. Cl.
USPC ............... 521/62; 521/65; 521/154; 521/187; 521/188; 528/38; 528/44; 528/85

(58) Field of Classification Search
USPC .......... 521/62, 65, 154, 187, 188; 528/38, 44, 528/85
See application file for complete search history.

(56) References Cited

U.S. PATENT DOCUMENTS

| 3,338,847 A | 8/1967 | Nitzsche et al. |
| 7,026,424 B2 * | 4/2006 | Schafer et al. .................. 528/38 |
| 2005/0075408 A1 | 4/2005 | Ringeisen et al. |
| 2008/0033100 A1 | 2/2008 | Scholey et al. |
| 2008/0286628 A1 | 11/2008 | Briehn et al. |

FOREIGN PATENT DOCUMENTS

| EP | 0363364 B1 | 6/1999 |
| JP | 59225703 A2 | 12/1984 |
| WO | 88/08738 A1 | 11/1988 |
| WO | 9825982 A1 | 6/1998 |
| WO | 2007/048691 A2 | 5/2007 |

OTHER PUBLICATIONS

Membrane Technologie and Applications, 2nd Edition, R.W. Baker, New York, Wiley, 2004.

* cited by examiner

*Primary Examiner* — Irina S Zemel
(74) *Attorney, Agent, or Firm* — Brooks Kushman P.C.

(57) ABSTRACT

Thin porous moldings of silicone copolymers, suitable for use as membranes in separation processes, are prepared by forming a solution or suspension of silicone copolymer in two solvents L1 and L2, casting the suspension or solution, and removing solvent L1 to form a silicone copolymer rich phase A, effecting structure formation, and then removing solvent L2 and residues of solvent L2 to form a thin porous molding.

6 Claims, No Drawings

METHOD FOR PRODUCING POROUS SILICON MOLDED BODIES

CROSS-REFERENCE TO RELATED APPLICATION

This application is the U.S. National Phase of PCT Appln. No. PCT/EP2011/050659 filed Jan. 19, 2011 which claims priority to German Application No. DE 10 2010 001 482.6 filed Feb. 2, 2010, which are incorporated herein by reference.

BACKGROUND OF THE INVENTION

1. Field of the Invention

The present invention relates to a process for producing porous silicone moldings and also to the moldings obtainable thereby and to their use.

2. Description of the Related Art

Porous silicone moldings are used in many sectors, for example as sealing material in vehicle construction or as insulating material in the building industry. A molding is a three-dimensional construct, preferably a foil or a fiber, and the thickness of the molding normally does not exceed 10 mm.

Porous silicone moldings are usually produced using two-part systems comprising a hydrogenmethylpolysiloxane and a vinylpolysiloxane. Adding a hydroxide source produces hydrogen, which leads to the actual foaming. Such a process is described in DE 1224040 for example. This process usually produces thick porous silicone moldings of open-cell or closed-cell structure, but is unsuitable for producing thin porous silicone moldings, for example membranes.

Membranes are thin porous moldings and are used to separate mixtures. They are further used in the textile sector, for example as breathable and water-repellent membranes. One advantage of membrane separation processes is that separation can be carried out even at low temperatures, such as room temperature for example, and therefore have lower energy requirements compared with thermal separation processes, such as distillation.

Phase inversion by evaporation is a known way to process cellulose acetate or polyvinylidene fluoride into thin porous moldings. This process does not need a coagulation medium or an additional foaming reaction. In the simplest case, a ternary mixture is prepared from a polymer, a volatile solvent and a second, less volatile solvent. Following wet film formation, the volatile solvent evaporates, causing the polymer to precipitate in the second solvent and form a porous structure. The pores are full of the second solvent. The second solvent is subsequently removed from the molding, for example by washing or evaporation, to ultimately obtain a porous molding. EP 363364 for example describes the production of porous PVDF moldings on the basis of this process.

The use of a phase inversion process for silicones is unfamiliar to a person skilled in the art, since any pores actually formed in the course of evaporation normally collapse again owing to the silicone still being flowable, and hence the molding loses its porosity.

The production of porous silicone moldings by the Loeb-Sourirajan process is known. JP 55225703 for instance teaches the production of a porous silicone membrane comprising a silicone-carbonate copolymer. This process exclusively provides an anisotropic pore size along the film layer thickness. In addition, a separate coagulation bath is also required at all times. It would be advantageous to be able to use other silicones or silicone copolymers to produce thin porous moldings in addition to the silicone copolymers mentioned in this patent specification. The production of isotropic porous silicone moldings would likewise be advantageous.

SUMMARY OF THE INVENTION

The problem addressed by the present invention was therefore to develop a process by which thin porous silicone moldings are obtainable in a technically very simple manner, yet which no longer has the disadvantages of prior art production processes; which makes it possible to use silicones as well as silicone copolymers; and is simple and economical to carry out. These and other objects are achieved by the present invention, which provides a process for producing thin porous moldings comprising a silicone compound S,
wherein
a first step comprises forming a solution or suspension comprising silicone compound S or starting silicone compound SA in a mixture comprising solvent L1 and solvent L2,
a second step comprises introducing the solution or suspension into a mold,
a third step comprises removing solvent L1 from the solution or suspension until silicone compound S ceases to be soluble in the mixture comprising solvent L1 and solvent L2 to form a phase A, rich in silicone compound S, and a phase B, lean in silicone compound S, and hence to effect structure formation through phase A, and
a fourth step comprises removing the solvent L2 and residues of the solvent L1,
wherein, when the silicone compound S is formed from starting silicone compound SA, this takes place in one or more steps selected from the first, second and third steps.

Preferably, the silicone compound S gels/precipitates in the third step to obtain the thin porous silicone molding from phase A. The pores are formed by phase B. This process is distinctly simpler and less costly than the corresponding processes disclosed in the literature.

DETAILED DESCRIPTION OF THE PREFERRED EMBODIMENTS

It was surprisingly found that thin porous silicone moldings are obtainable by the specifically evaporation-induced phase separation induced by removal of solvent L1.

This is all the more surprising because silicones are normally not processable into porous moldings simply by solvent removal, especially solvent evaporation. Normally the foils obtained are compact, i.e., devoid of any porosity.

It was found that specific silicone compounds S are particularly suitable in that they have sufficient mechanical strength following structure formation by phase A. That is, the cavities formed remain stable following the removal of the solvent L2 and residues of solvent L1. This can be accomplished in several ways. Either the liquid or gel-shaped starting silicone compounds SA are covalently linked to form the silicone compound S in the first, second and/or third step, for example via condensation or addition reactions, or the silicone compounds S crosslink via intermolecular interactions, for example via ionic interactions, hydrogen bonds or van der Waals interactions.

It is particularly preferable to crosslink the silicone moldings via covalent bonds, formed for example by condensation reactions or free-radical mechanisms. Particular preference is given to crosslinking liquid silicones, i.e., with viscosities up to not more than 300,000 MPa, gel-shaped or high-viscosity silicones, i.e., viscosities above 2,000,000 MPa, as marketed for example by Wacker Chemie AG under the ELASTOSIL® trademark. Very particular preference is given to crosslinking via hydrogen bonds of the kind appearing for example in organopolysiloxane-polyurea copolymers marketed by Wacker Chemie AG under the GENIOMER® trademark.

Crosslinking can take place separately from or simultaneously with the structure formation of the thin porous moldings comprising silicone compound S.

Such a process for producing porous silicone moldings had hitherto not been described and was unforeseeable in this form.

The porous silicone moldings have vapor transmission rates which are distinctly higher than those of compact silicone foils of the prior art. Furthermore, liquids, such as water for example, only pass through the porous silicone moldings at a higher pressure.

Any silicone polymer that satisfies the recited properties is in principle useful as silicone compound S. Examples of suitable silicone compounds S appear in EP 1884541 A1.

Preference for use as starting silicone compounds SA is given to functionalized silicones that can be processed into mechanically stable moldings via a crosslinking reaction.

The usable silicone compound S and starting silicone compound SA of the present invention can be pure siloxanes of the structure "Si—O—Si", silcarbanes of the structure "Si—R"—Si", where R" is a divalent, optionally substituted or heteroatom-interrupted hydrocarbon moiety, or represent copolymers comprising any organosilicon groups.

The starting silicone compounds SA used according to the present invention are preferably organosilicon compounds having at least two Si-bonded crosslinking-capable groups, for example those which have been used in crosslinkable compositions in the past. These organosilicon compounds contain units of general formula (I)

$$R_a Z_b (R^1 O)_b SiO_{(4-a-b)/2} \quad (I)$$

where
R represents substituted or unsubstituted hydrocarbon moieties, which can be interrupted by oxygen or nitrogen atoms,
Z represents crosslinking-capable moieties,
a represents the values 0, 1, 2 or 3, preferably 1 or 2, and
b represents the values 0, 1, 2 or 3, preferably 0, 1 or 2, more preferably 0,
with the proviso that the sum total of a+b is not more than 3 and each molecule has to have at least two Z moieties.

R preferably comprises monovalent hydrocarbon moieties of 1 to 18 carbon atoms, which are optionally substituted with halogen atoms, amino groups, ether groups, ester groups, epoxy groups, mercapto groups, cyano groups or (poly)glycol moieties, the latter being constructed of oxyethylene and/or oxypropylene units, and more preferably comprises alkyl moieties of 1 to 12 carbon atoms, especially methyl.

R, however, may also comprise divalent moieties that bond two silyl groups together for example.

Examples of R moieties are alkyl moieties such as methyl, ethyl, n-propyl, isopropyl, 1-n-butyl, 2-n-butyl, isobutyl, tert-butyl, n-pentyl, isopentyl, neopentyl, and tert-pentyl; hexyl such as n-hexyl; heptyl such as n-heptyl; octyl such as n-octyl and isooctyl, such as 2,2,4-trimethylpentyl; nonyl such as n-nonyl; decyl such as n-decyl; dodecyl such as n-dodecyl; octadecyl such as n-octadecyl; cycloalkyl such as cyclopentyl, cyclohexyl, cycloheptyl and methylcyclohexyl; aryl such as phenyl, naphthyl, anthryl and phenanthryl; alkaryl such as o-, m-, p-toyl, xylyl and ethylphenyl; and aralkyl such as benzyl and phenylethyl.

Examples of substituted moieties R are methoxyethyl, ethoxyethyl, ethoxyethoxyethyl, chloropropyl and trifluoropropyl.

Examples of divalent moieties R are ethylene, polyisobutylenediyl and propanediyl-terminated polypropylene glycol moieties.

The crosslinking-capable groups Z, present in employed starting silicone compounds SA, and which are involved in the crosslinking reaction, may be hydroxyl moieties and any optionally substituted hydrocarbon moieties bonded to the silicon atom via oxygen atoms or nitrogen atoms, or may be unsaturated hydrocarbon moieties such as ethenyl or ethynyl. The crosslinking-capable groups Z may further be epoxides, isocyanates, acrylates or methacrylates, in which case these end groups can be bonded to the silicon atoms of the starting silicone compounds SA by optionally substituted hydrocarbon moieties, whose carbon chains may optionally be interrupted by heteroatoms, for example oxygen or nitrogen.

Preferably, Z is hydroxyl, an —OR$^1$ moiety where R$^1$ represents optionalloy substituted hydrocarbon moieties, which may be interrupted by oxygen atoms such as methoxy, ethoxy, n-propoxy, i-propoxy, n-butoxy, i-butoxy, s-butoxy, tert-butoxy or 2-methoxyethoxy, acyloxy moieties such as acetoxy, amino moieties such as methylamino, dimethylamino, ethylamino, diethylamino and cyclohexylamino, amido moieties such as N-methyl-acetamido and benzamido, aminoxy moieties such as diethylaminoxy, oximo moieties such as methylethylketoximo and methylisobutylketoximo, and enoxy moieties such as 2-propenoxy.

It is particularly preferable for Z to be hydroxyl, an —OR$^1$ moiety where R$^1$ is as defined above, or an acyloxy moiety, especially acetoxy, methoxy or ethoxy. Examples of further R$^1$ moieties are the monovalent moieties indicated for R. R$^1$ is preferably an alkyl moiety of 1 to 12 carbon atoms, more preferably methyl or ethyl. It is likewise particularly preferable for Z to be an unsaturated hydrocarbon moiety —R$^2$, C=CR$^2_2$ and also —CCR$^2$, such as vinyl, 1-propenyl, 2-propenyl, ethynyl, 1-propynyl, 2-propynyl, methacryloyl, or acryloyl, which may be bonded to the silicon atoms of the starting silicone compounds SA by optionally substituted hydrocarbon moieties. Examples of R$^2$ moieties are the monovalent moieties indicated for R and also hydrogen.

It is further preferable for Z to be an epoxide, such as glycidoxypropyl or epoxyhexyl, or an isocyanate, such as the 1-propylisocyanate moiety.

The SA starting silicone compounds may be covalently linked, for example crosslinked in a manner familiar to a person skilled in the art, in the first, second and/or third step to form the silicone compound S. When ethenyl- or ethynyl-functionalized starting silicone compounds SA are used, a starting silicone compound SA having an Si-bonded hydrogen atom, which is preferably linear, cyclic or branched, consisting of units of the general formula (II)

$$R^4_e H_f SiO_{(4-e-f)/2} \quad (II)$$

where
R$^4$ has the above meanings of R,
e represents the values 0, 1, 2 or 3,
f represents the values 0, 1 or 2,
and also e+f represents the values 0, 1, 2, 3,
is used as a crosslinking component, with the proviso that each molecule has an average of at least 2 Si-bonded hydrogen atoms.

The usable silicone compounds S of the present invention are preferably copolymers, in which case any silicone copolymer known to the literature is useful as silicone compound S. Examples of such silicone copolymers include silicone-carbonates, silicone-imides, silicone-imidazoles, silicone-urethanes, silicone-amides, silicone-polysulfones, silicone-polyethersulfones, silicone-polyureas and also silicone-polyoxalyldiamine copolymers.

Particular preference is given to the use of organopolysiloxane/polyurea/polyurethane/polyamides or polyoxalyldiamine copolymers of general formula (III)

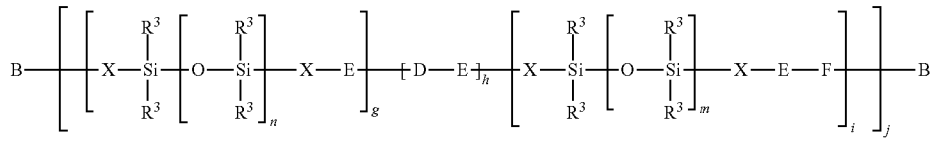

where the structural element E is selected from general formulae (IVa-f)

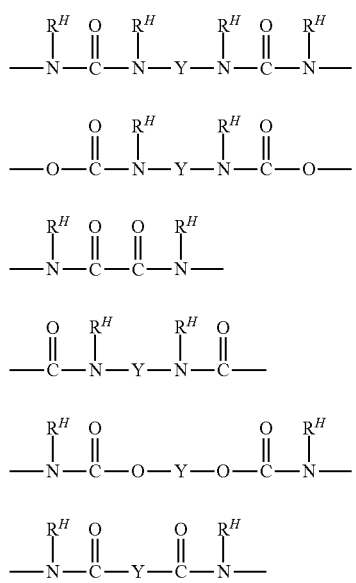

where the structural element F is selected from general formulae (Va-f)

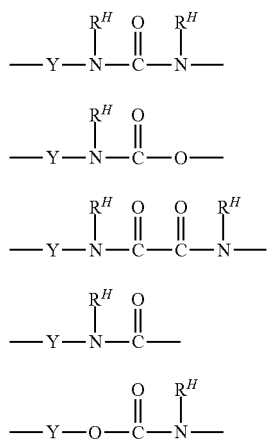

where
$R^3$ has the meaning of R,
$R^H$ represents hydrogen or has the meanings of R,
X represents an alkylene moiety of 1 to 20 carbon atoms in which mutually nonadjacent methylene units can be replaced by —O— or an arylene moiety of 6 to 22 carbon atoms,
Y represents a divalent, optionally fluorine- or chlorine-substituted hydrocarbon moiety of 1 to 20 carbon atoms,
D represents an alkylene moiety of 1 to 700 carbon atoms which is optionally substituted by fluorine, chlorine, $C_1$-$C_6$-alkyl or $C_1$-$C_6$-alkyl ester and in which mutually nonadjacent methylene units may be replaced by groups —O—, —COO—, —OCO—, or —OCOO—, or an arylene moiety of 6 to 22 carbon atoms,
B and B' represent a reactive or nonreactive end group attached to the polymer by covalent bonding,
m represents an integer from 1 to 4000,
n represents an integer from 1 to 4000,
g represents an integer of at least 1,
h represents an integer from 0 to 40,
i represents an integer from 0 to 30, and
j represents an integer above 0.

$R^3$ preferably comprises the moieties indicated above for R.

$R^H$ preferably comprises hydrogen or the moieties indicated above for R.

Y preferably comprises hydrocarbon moieties of 3 to 13 carbon atoms optionally substituted with halogen atom such as fluorine or chlorine, and more preferably comprises a hydrocarbon moiety of 3 to 13 carbon atoms, especially 1,6-hexamethylene, 1,4-cyclohexylene, methylenebis(4-cyclohexylene), 3-methylene-3,5,5-tri-methylcyclohexylene, phenylene, naphthylene, m-tetra-methylxylylene and also methylenebis(4-phenylene).

Examples of divalent hydrocarbon moieties Y are alkylene moieties, such as methylene, ethylene, n-propylene, isopropylene, n-butylene, isobutylene, tert-butylene, n-pentylene, isopentylene, neopentylene, and tert-pentylene, hexylene moieties such as n-hexylene, heptylene moieties such as n-heptylene, octylene moieties such as n-octylene and isooctylene moieties such as 2,2,4-trimethylpentylene, nonylene moieties such as n-nonylene, decylene moieties such as n-decylene, dodecylene moieties such as n-dodecylene; cycloalkylene moieties such as cyclopentylene, cyclohexylene, cycloheptylene, and methylcyclohexylene moieties such as methylenebis(4-cyclohexylene) and 3-methylene-3,5,5-trimethylcyclohexylene; arylene moieties such as phenylene and naphthylene; alkarylene moieties such as o-, m-, p-tolylene, xylylene moieties such as m-tetramethylxylylene, and ethylphenylene moieties; and aralkylene moieties such as benzylene, phenylethylene and methylenebis(4-phenylene).

X preferably comprises alkylene moieties having 1 to 20 carbon atoms, which may be interrupted by oxygen atoms, more preferably comprises alkylene moieties of 1 to 10 carbon atoms, which may be interrupted by an oxygen atom, and even more preferably comprises n-propylene, isobutylene, 2-oxabutylene or methylene.

Further examples of X moieties are the examples indicated for Y and also optionally substituted alkylene moieties in each of which the carbon chain may be interrupted by oxygen atoms, for example 2-oxabutylene.

B is preferably a hydrogen atom, an OCN—Y—NH—CO- moiety, an $H_2N$—Y—NH—CO— moiety, an $R^3_3Si$—(O—$SiR^3_2)_n$-moiety or an $R^3_3Si$—(O—$SiR^3_2)_n$—X-E- moiety.

B' preferably has meanings indicated for B.

D preferably comprises divalent polyether moieties and alkylene moieties, more preferably divalent polypropylene glycol moieties and also alkylene moieties of at least 2 and at most 20 carbon atoms, such as ethylene, 2-methylpentylene and butylene, and in particular polypropylene glycol moieties of 2 to 600 carbon atoms, ethylene and 2-methylpentylene.

n is preferably a number of at least 3, especially at least 10 and preferably at most 800, especially at most 400.

m preferably denotes the ranges indicated for n.

g is preferably a number of at most 100 and more preferably from 10 to 60.

h is preferably a number of at most 10, more preferably 0 or 1 and especially 0.

j is preferably a number of at most 400, more preferably 1 to 100 and especially 1 to 20.

i is preferably a number of at most 10, more preferably 0 or 1, especially 0.

The systems described herein can all be cured using methods familiar to a person skilled in the art. These systems optionally comprise still further typical additives, for example functional silanes.

Useful silicone compounds S additionally include all silicone copolymers known in the literature which in addition to the silicone portion further possess organic polymer units, for example polyimides, polyurethanes, polysulfones, polyimidazoles, and polyamides.

In addition to the silicone compounds S and/or starting silicone compounds SA, the process can additionally employ other polymeric compounds. The thin porous moldings produced in the process preferably consist of the silicone compounds S and/or starting silicone compounds SA to an extent of at least 50%, more preferably to an extent of at least 80%, especially to an extent of at least 90% and most preferably to an extent of at least 95%.

Solvent L1 is easier to remove than solvent L2 from the solution or suspension of silicone compound S or starting silicone compound SA prepared in the first step. Removability applies more particularly to easier evaporation or extraction.

The term solvent L1 comprises all organic and inorganic compounds which dissolve silicone compound S and/or starting silicone compounds SA at most temperatures. This term preferably comprises all compounds which, under otherwise identical conditions, for example pressure and temperature, can dissolve the silicone compound S and/or starting silicone compounds SA in a higher proportion than solvent L2.

That is, the maximum attainable concentration of silicone compound S and/or starting silicone compounds SA in solvent L1 is preferably higher than the maximum attainable concentration of silicone compound S and/or starting silicone compounds SA in solvent L2.

The maximum attainable concentration of silicone compound S and/or starting silicone compounds SA is preferably higher in solvent L1 than in solvent L2 by a factor of 2, more preferably by a factor of 10 and yet even more preferably by a factor of 100.

The term solvent L1 comprises additionally also higher molecular weight compounds, for example liquid polymers.

Depending on solvent L1 and silicone compound S and/or starting silicone compounds SA, elevated pressures can also affect solubility.

Preference is given to solvents L1 in which the silicone polymers dissolve at not less than 10% by weight, more preferably at not less than 15% by weight and especially at not less than 20% by weight at 20° C. and 1 bar.

Depending on solvent and polymer, elevated pressures can also affect solubility.

The term solvent L2 additionally also comprises higher molecular weight compounds, for example liquid polymers.

Preference is given to solvents L2 in which the silicone polymers dissolve at not more than 20% by weight, more preferably at not more than 10% by weight and especially at not more than 1% by weight at 20° C. and 1 bar.

The solvent L1 and the solvent L2 may each consist of one or more constituents.

Preferably, the solvent L1 or any constituent of solvent L1 has a higher vapor pressure at 20° C. and 1 bar than the solvent L2 or any constituent of solvent L2.

Preferably, the boiling point of solvent L1 or any constituent of solvent L1 at 1 bar is not less than 30° lower than the boiling point of solvent L2 or any constituent of solvent L2, more preferably not less than 40° lower and especially not less than 50° lower.

When the first step produces a suspension of silicone compound S and/or starting silicone compounds SA in a mixture comprising solvent L1 and solvent L2, this is indicative of beginning phase separation, which can be partly suppressed by stirring.

Converting the solution or suspension into the silicone molding can be effected in various ways. When, for example, a homogeneous solution of silicone compound S and/or starting silicone compounds SA is present, the phase separation in the third step can initially result in a suspension from which a first gel body then forms, which can be converted into a stable molding comprising silicone compound S by further removal of solvent L1 and solvent L2.

When a suspension is already present in the first step, the phase separation of the third step can produce the gel structure from the suspension of silicone compound S. This is usually quicker than when starting from homogeneous solutions of silicone compound S.

Preferably, at most 30% by weight, more preferably at most 20% by weight and especially at most 10% by weight of the solvent L1 used in the first step is present in phases A and B after the third step.

The solvent L1 can be removed from the casting solution in the third step by any technically known means. It is preferable for solvent L1 to be removed by evaporation or extraction. Examples of preferred technical processes are evaporation by convection, forced convection, heating or evaporation in a moist atmosphere, and extraction by solvent exchange or scrubbing with a volatile solvent. Whichever method is chosen has to be such that the moldings are produced within an acceptable time, but the desired structure can also be actually formed.

The rate of evaporation is preferably chosen such that the liquid-liquid phase separation does not occur under thermodynamic equilibrium conditions, since otherwise no porous structures are formed.

If the employed starting silicone compounds SA still have to be crosslinked, all typical silicone crosslinking reactions are employed. Depending on silicone type, this is accomplished, for example, by heating, pressure or by means of UV light. For example, the polycondensation reaction of alkoxy- or acetoxy-functional silicones is effected by means of tin catalysts, for example DBTL (dibutylditin laurate), and water, which comes from the ambient air for example.

When, for example, vinyl-functional starting silicone compounds SA are used, crosslinking is effected inter alia with peroxides, which are used as free-radical initiators. In addition to the free-radical initiator, H-siloxanes needed to form crosslinked systems are additionally added. The curing of vinyl-functional starting silicone compounds SA can further also be carried out by means of platinum catalysts and H-siloxanes.

The solvent L2 need not always be inert. The polymer may be swellable in the solvent L2. Preference is given to solvents L2 having an adsorption of preferably not less than 10% by weight and more preferably not less than 50% by weight.

The appropriate choice of solvent L2 is important because the latter decides whether the structure does or does not remain intact after phase separation.

The solvent L2 can be removed from the molding in the fourth step in any manner familiar to a person skilled in the art. Examples are extraction, evaporation, a successive solvent exchange or simple scrubbing of solvent L2.

The solution or suspension of silicone compound S and/or starting silicone compounds SA is obtainable in various ways. One preferred embodiment of the invention comprises dissolving silicone compound S and/or starting silicone compounds SA in solvent L1 and adding solvent L2. In a particularly preferred embodiment of the invention, the polymer is dissolved in a solvent mixture of L1 and L2.

The solubilities of silicone compound S and/or starting silicone compounds SA in solvent L1 are familiar to a person skilled in the art or, when no data are found, are readily determined by solubility tests. Fitting solvents L2 are quickly ascertained in a few tests, for example; in simple turbidity titrations. A homogeneous polymer solution is admixed with a second solvent until the polymer is observed to precipitate.

Since the solubilities of silicone compound S and/or starting silicone compounds SA differ substantially, solvent L1 for a particular silicone compound S and/or starting silicone compounds SA can also be solvent L2 for a different silicone compound S.

Preferred organic solvents L1 and solvents L2 are hydrocarbons, halogenated hydrocarbons, ethers, alcohols, aldehydes, ketones, acids, anhydrides, esters, N-containing solvents and sulfur-containing solvents.

Examples of common hydrocarbons are pentane, hexane, dimethylbutane, heptane, 1-hexene, 1,5-hexadiene, cyclohexane, terpentine, benzene, isopropylbenzene, xylene, toluene, naphtha, naphthalene and also tetra-hydronaphthalene. Examples of common halogenated hydro-carbons are fluoroform, perfluoroheptane, methylene chloride, chloroform, carbon tetrachloride, 1,2-dichloroethane, 1,1,1-trichloroethane, tetrachloro-ethene, trichloroethene, pentyl chloride, bromoform, 1,2-dibromoethane, methylene iodide, fluorobenzene, chlorobenzene and also 1,2-dichlorobenzene. Examples of common ethers are diethyl ether, butyl ethyl ether, anisole, diphenyl ether, ethylene oxide, tetrahydrofuran, furan, triethylene glycol and also 1,4-dioxane. Examples of common alcohols are methanol, ethanol, propanol, butanol, octanol, cyclohexanol, benzyl alcohol, ethylene glycol, ethylene glycol monomethyl ether, propylene glycol, butylglycol, glycerine, phenol and also m-cresol.

Examples of common aldehydes are acetaldehyde and butyraldehyde. Examples of common ketones are acetone, diisobutyl ketone, 2-butanone, cyclohexanone and also acetophenone. Common examples of acids are formic acid and acetic acid. Common examples of anhydrides are acetic anhydride and maleic anhydride. Common examples of esters are methyl acetate, ethyl acetate, butyl acetate, phenyl acetate, glycerol triacetate, diethyl oxalate, dioctyl sebacate, methyl benzoate, dibutyl phthalate, DBE® (DuPont de nemours) and also tricresyl phosphate. Common examples of nitrogenous solvents are nitromethane, nitrobenzene, butyronitrile, aceto-nitrile, benzonitrile, malononitrile, hexylamine, aminoethanol, N,N-diethylaminoethanol, aniline, pyridine, N,N-dimethylaniline, N,N-dimethylformamide, N-methylpiperazine and also 3-hydroxypropionitrile. Common examples of sulfur-containing solvents are carbon sulfide, methanethiol, dimethyl sulfone, dimethyl sulfoxide and also thiophene. Common examples of inorganic solvents are water, ammonia, hydrazine, sulfur dioxide, silicon tetrachloride and titanium tetrachloride.

Any nonreactive polymer can be used as higher molecular weight solvents L1 and/or solvents L2. Preference is given to using nonreactive polymers that are liquid at the processing temperature and are available in industrial quantities.

Examples of such solvents L1 and/or solvents L2 include polydimethylsiloxanes with nonreactive end groups, for example trimethylsilyl-terminated linear silicones, phenylsiloxanes, cyclic siloxanes, for example cyclo-hexadimethylsiloxane or cyclodecadimethylsiloxane. Further examples of such solvents L1 and/or solvents L2 include polypropylene oxides, polyethylene oxides, polyamides, polyvinyl acetates, polyisobutenes, poly-acrylates, polybutadienes, polyisoprenes and copolymers of the groups of chemical compounds listed.

Particularly preferred solvents L1 for silicone copolymers as silicone compound S and/or starting silicone compounds SA are alcohols, for example isopropanol.

Particularly preferred solvents L1 for silicones are for example toluene, xylene, benzines (bp. above 80° C.), pentane or hexane. Particularly preferred solvents L2 for silicone copolymers as silicone compound S and/or starting silicone compounds SA are for example toluene, polyethylene glycols, polypropylene glycols, triethylene glycol, DBE®, glycerol or NMP.

The silicone compounds S and/or starting silicone compounds SA can likewise be dissolved in ternary solvent mixtures. A common example of a tertiary solvent mixture can be for instance a mixture of one solvent L1 and two solvents L2. An example of a ternary solvent mixture is isopropanol (solvent L1), N-methyl-piperazine (solvent L2) and dimethylformamide (solvent L2). The silicone compounds S and/or starting silicone compounds SA can likewise be dissolved in solvent mixtures comprising more than one solvent L1 and more than two solvents L2.

The quantitative ratios between solvent L1 and solvent L2 can vary within wide limits. Preferably, at least 2 and especially at least 10 parts by weight of solvent L2 and at most 5000 and especially at most 1000 parts by weight of solvent L2 are used per 100 parts by weight of solvent L1 in the first step.

The proportion of solvent L1 and solvent L2 in the solution or suspension prepared in the first step is preferably up to 95% by weight, more preferably up to 80% by weight and even more preferably up to 60% by weight.

Preferably, the solution or suspension prepared in the first step contains at least 1% by weight, more preferably at least 10% by weight, especially at least 15% by weight and at most 70% by weight, more preferably at most 40% by weight, especially at most 25% by weight of silicone compound S and/or starting silicone compounds SA.

Preferably, the solution or suspension is introduced into a mold in the second step at temperatures of at least 0° C., more preferably at least 10° C. and especially at least 20° C. and at most 60° C. and more preferably at most 50° C.

In one embodiment of the invention, further additives are added to the solution or suspension. Typical additives are inorganic salts and polymers. Common inorganic salts are LiF, NaF, KF, LiCl, NaCl, KCl, $MgCl_2$, $CaCl_2$, $ZnCl_2$ and $CdCl_2$.

The additives added can remain in the as-produced molding or be extracted/washed off with other solvents.

Mixtures of different additives can also be incorporated into the solution or suspension. The concentration of additives in the polymer solution is preferably at least 0.01% by weight, more preferably at least 0.1% by weight and especially at least 1% by weight and at most 15% by weight and more preferably at most 5% by weight. In one particularly preferred embodiment of the invention, from 1 to 3% by weight of LiCl and from 2 to 5% by weight of NaCl is introduced into the solution or suspension.

The solutions or suspensions may further contain the additives and additions customary in formulations. These include inter alia flow control agents, surface-active substances, adhesion promoters, photoprotectants such as UV absorbers and/or free-radical scavengers, thixotropic agents and also further solid and filler materials. Additions of this type are preferred for producing the particular property profiles desired for the moldings.

In a likewise preferred embodiment of the invention, the porous moldings further contain a proportion of particles. A list of suitable particles appears in EP 1940940.

In a further preferred embodiment of the invention, the porous moldings also contain actively reinforcing particles. Examples of reinforcing particles are pyrogenic or precipitated silica having treated or untreated surfaces.

The particle content of the solutions or suspensions is preferably 0-20% by weight, more preferably 0-10% by weight and even more preferably 0-5% by weight, based on the total weight. The polymer solutions may contain one or more different types of particle, for example silicon dioxide and also aluminophosphate.

Preferred geometric embodiments of obtainable thin porous moldings are foils, hoses, fibers, hollow fibers, mats, the geometric shape not being tied to any fixed forms, but being very largely dependent on the substrates used.

Preference is further given to three-dimensional porous moldings, in which the porous moldings are either applied as a coating or are removed therefrom again after structure formation.

To produce the moldings, the solutions or suspensions are preferably spun or applied to a substrate in the second step. The solutions or suspensions applied to substrates are preferably further processed into foils, while the spun solutions or suspensions are preferably processed into hoses, fibers and hollow fibers.

It is particularly preferable for the process to produce porous foils and three-dimensional porous moldings from silicone compound S.

The substrates preferably contain one or more materials from the group comprising metals, metal oxides, polymers or glass. The substrates are in principle not tied to any geometric shape. However, it is preferable to use substrates in the form of plates, foils, textile sheet substrates, woven or preferably nonwoven meshes or more preferably in the form of fibrous nonwoven webs. When porous moldings comprising silicone compound S are formed in dip or spray coating in particular, particular preference is further given to three-dimensional constructs, for example housings, stones, gloves or other liftoff moldings.

Substrates based on polymers contain for example polyamides, polyimides, polyetherimides, polycarbonates, polybenzimidazoles, polyethersulfones, polyesters, polysulfones, polytetrafluoroethylenes, polyurethanes, polyvinyl chlorides, cellulose acetates, polyvinylidene fluorides, polyether glycols, polyethylene terephthalate (PET), polyaryletherketones, polyacrylo-nitrile, polymethyl methacrylates, polyphenylene oxides, polycarbonates, polyethylenes or polypropylenes. Preference is given to polymers having a glass transition temperature Tg of at least 80° C. Substrates based on glass contain for example quartz glass, lead glass, float glass or lime-soda glass.

Preferred mesh or web substrates contain glass, carbon, aramid, polyester, polyethylenes, polypropylenes, polyethylenes/polypropylenes copolymer or polyethylene terephthalate fibers.

The layer thickness of substrates is preferably ≥1 μm, more preferably ≥50 μm and even more preferably ≥100 μm and preferably ≤2 mm, more preferably ≤600 μm and even more preferably ≤400 μm. The most preferred ranges for the layer thickness of substrates are the ranges formulatable from the aforementioned values.

The thickness of porous moldings comprising silicone compound S is chiefly determined by the amount of solution or suspension. Since the process of the present invention preferably involves an evaporation or extraction step, comparatively thin moldings are preferred.

Any technically known form of applying the solution or suspension to substrates can be employed to produce the porous moldings. The solution or suspension is preferably applied to the substrate using a blade or via meniscus coating, casting, spraying, dipping, screen printing, intaglio printing, transfer coating, gravure coating or spin-on-disk. The solutions or suspensions thus applied have film thicknesses of preferably ≥10 μm, more preferably ≥100 μm, especially ≥200 μm and preferably ≤10 000 μm, more preferably ≤5000 μm, especially ≤1000 μm. The most preferred ranges for the film thicknesses are the ranges formulatable from the aforementioned values.

Preferably, evaporation is used to remove solvent L1 from the molded solutions or suspensions in the third step and solvent L2 and residues of solvent L1 preferably thereafter in the fourth step. Evaporation temperatures are preferably at least 10° C., more preferably at least 20° C. and at most 200° C. and more preferably at most 150° C. Evaporation can be carried out at any desired pressures, for example at reduced pressure, at superatmospheric pressure or at atmospheric pressure. Evaporation can likewise take place under defined conditions of humidity. Relative humidities ranging from 0.5 to 99% are particularly preferred depending on the temperature. As mentioned, the evaporation step can also take place under defined solvent atmospheres, for example $H_2O$ vapor, alcohol vapor. The saturation content of the atmosphere can be varied within wide limits, for example between 0% (dry atmosphere) to 100% (complete saturation at the processing temperature). This makes it possible to vary the evaporation rate of solvent L1 and/or the imbibition of a solvent or solvent L2 from the atmosphere within wide limits.

The preferred evaporation time can be determined in a few tests for the particular system. Evaporation time is preferably at least 0.1 second to several hours. An exact evaporation time cannot be specified because it has to be determined individually for each system and for each solution or suspension.

In a likewise preferred embodiment of the invention, solvent L2 and residues of solvent L1 are removed in the fourth step by extraction.

Extraction is preferably done with a further solvent which does not destroy the porous structure formed, but is readily miscible with the solvent L2. It is particularly preferable to use water as extractant. Extraction preferably takes place at temperatures between 20° C. and 100° C. The preferred extraction time can be determined in a few tests for the particular system. The extraction time is preferably at least 1 second to several hours. And the operation can also be repeated more than once.

Both the evaporation time and the evaporation conditions have an influence on the porous structures with regard to pore type, pore size and total porosity.

It is preferable to produce moldings having a uniform pore distribution along the cross section. It is particularly preferable to produce microporous moldings, having pore sizes of 0.1 µm to 20 µm.

The moldings preferably have an isotropic distribution of pores.

If preferred for the envisaged application, an anisotropic distribution of pores can also be achieved in the porous molding of the present invention through the choice of process parameters.

The moldings obtained by following the process generally have a porous structure. The free volume is preferably at least 5% by volume, more preferably at least 20% by volume and especially at least 35% by volume and at most 90% by volume, more preferably at most 80% by volume and especially at most 75% by volume.

The moldings thus obtained can be used, for example, directly as membranes, preferably for separation of mixtures. Alternatively, the moldings can also be lifted off the substrate and then be used directly without further support or, optionally, applied to other substrates, such as wovens, nonwovens or foils, preferably at elevated temperatures and by employment of pressure, for example in a hot press or in a laminator. To improve adherence to other substrates, adhesion promoters can be used.

In a preferred embodiment, the solution or suspension is spun in the second step. The moldings obtainable thereby are fibers and hollow fibers.

Spinning is understood by a person skilled in the art to mean the production of fibers by jetting polymer solutions through fiber spinning jets.

Hollow fibers are known per se to a person skilled in the art and are generally cylindrical fibers having one or more continuous void spaces in cross section; such void spaces are also known as channels.

The outer diameter of fibers is preferably at least 10 µm, more preferably at least 100 µm and especially at least 300 µm and preferably at most 5 mm, more preferably at most 2 mm and especially at most 1000 µm. The inner diameter of hollow fibers, i.e., the channel diameter, is preferably at least 8 µm, more preferably at least 80 µm and especially at least 280 µm and preferably at most 4.5 mm, more preferably at most 1.9 mm and especially at most 900 µm.

Hollow fibers may have any desired length.

During the production of hollow fibers, the void spaces in hollow fibers typically contain a gas, a gas mixture or a liquid, preferably air, especially compressed air, or nitrogen, oxygen, carbon dioxide, water or organic solvents, such as hydrocarbons, halogenated hydro-carbons, ethers, alcohols, ketones, acids, esters, nitrogen-containing solvents or sulfur-containing solvents. This prevents the void spaces in hollow fibers collapsing.

Spinning preferably takes place at temperatures of 20 to 150° C. Hollow fibers may optionally be produced by co-spinning one or more further polymeric plies. Multi-ply hollow fibers are obtained in this way.

The hollow fibers thus obtained are further processed by following the third and fourth steps of the process according to the present invention.

In a further preferred form of the invention, the porous silicone moldings are produced by extrusion into self-supporting films or onto substrates.

The finalized moldings have layer thicknesses of preferably at least 1 µm, more preferably at least 10 µm, especially at least 50 µm and most preferably 100 µm and preferably at most 10,000 µm, more preferably at most 2000 µm, especially at most 1000 µm and even more preferably at most 500 µm.

The moldings thus obtained can be used directly as membranes, preferably for separation of mixtures, or alternatively be subjected to a further, common aftertreatment, for example a thermal treatment, treatment with high or low pressure plasma, irradiation with gamma, x-ray, microwave or actinic radiation or a surface modification, for example a surface coating.

Thickness for the surface coating or the impregnated surfaces on moldings is preferably at least 10 nm, more preferably at least 100 nm, especially at least 500 nm and preferably at most 500 µm, more preferably at most 50 µm and especially at most 10 µm. Useful coating ingredients include for example polymers such as polyamides, polyimides, polyetherimides, polycarbonates, polybenzimidazoles, polyethersulfones, polyesters, polysulfones, polytetrafluoroethylenes, polyurethanes, silicones, polydimethylsilicones, poly-methylphenylsilicones, polymethyloctylsilicones, poly-methylalkylsilicones, polymethylarylsilicones, poly-vinyl chlorides, polyether glycols, polyethylene terephthalate (PET), polyaryletherketones, polyacrylo-nitrile, polymethyl methacrylates, polyphenylene oxides, polycarbonates, polyethylenes or polypropylenes. The polymers can be applied to the moldings using customary methods, for example by laminating, spraying, blade coating or adhering. Such a coating is preferably applied to moldings having pores in the range from 10 nm to 10 µm.

The moldings are useful as coating for three-dimensional constructs to change surface properties thereof with regard to, for example, acoustical or thermal insulation or shock absorption. The breath-ability achievable in coating may represent a desired additional property. Preference is given to coating housings, building products or textiles with the moldings of the present invention.

The porous silicone moldings can further also be used in wound dressings. It is likewise preferable to use the porous silicone moldings in packaging materials especially in the packaging of food products which still have to ripen after production.

The moldings are useful as a membrane for all common processes for separating mixtures, such as reverse osmosis, gas separation, pervaporation, nanofiltration, ultrafiltration or microfiltration. The moldings can be used to effect solid-solid, gas-gas, solid-gas or liquid-gas, especially liquid-liquid or liquid-solid separation of mixtures.

When used as membranes, the moldings achieve high separation performances in the removal of particles, bacteria and viruses from water. The membranes are also useful for removing water from motor fuels, such as gasoline, bioethanol or diesel fuels. Further fields of use for the moldings are vapor permeation systems for the separation of ethanol-water mixtures or for the removal of volatile organic compounds (VOCs) from wastewaters, for example for removal of benzene, acetone, isopropanol, ethanol, methanol, xylenes, toluene, vinyl chloride, hexane, anilines, butanol, acetaldehyde, ethylene glycol, DMF, DMAC, methyl ethyl ketones and also methyl isobutyl ketone.

The moldings are also useful for cleaning up electrodeposition paint, for example in the automotive industry, protein cleanup, the purification of oil-water emulsions, for example for cooling and lubricating workpieces, and also the industrial water treatment of wastewaters containing particulate impurities, for example residual latex. Further typical applications are the removal of bacteria and/or viruses from water, the sterile filtration of pharmaceutical products, the sterilization of wine and beer, the production of particle-free ultrapure water for the electrical industry, and also the treatment of wastewater in water treatment plants in so-called membrane-bioreactor systems.

The moldings of the present invention can likewise be used in apparel items, for example in jackets, gloves, caps or shoes, or as roofing. The moldings are water repellent and breathable in the uses.

The moldings can likewise be used for blood filtration, for example dialysis/hemodialysis.

Further uses of the moldings are described for example in Membrane Technology and Applications, second Edition, R. W. Baker, New York, Wiley, 2004.

The moldings thus produced can also be used as separators, for example in primary and secondary batteries alike. It is particularly preferable in this connection to use the moldings in lithium-ion batteries.

The moldings can also be assembled into common modules, for example hollow fiber modules, spiral-wound modules, plate modules, cross flow modules or dead end modules.

Further applications for porous silicone moldings coincide with typical applications of known silicone foams, for example heat/cold insulation, acoustical insulation, shock absorption or gasket rings.

The above symbols in the above formulae all have their respective meanings independently of each other. The silicon atom is tetravalent in all formulae.

In the examples which follow, all amounts and percentages are by weight, all pressures are 0.10 MPa (abs.) and all temperatures are 20° C., unless otherwise stated.

Example 1

Producing a Casting Solution with N-methyl-2-pyrrolidone

To 16 g of isopropanol, boiling point 82° C. and 16 g of N-methyl-2-pyrrolidone (NMP), boiling point 203° C. are added 8 g of a polymer mixture consisting of 2 g of organopolysiloxane-polyurea copolymer (GENIOMER® 200 from Wacker Chemie AG) and 6 g of an organopolysiloxane-polyurea copolymer (SLM TPSE 100 from Wacker Chemie AG).

The entire batch is subsequently dissolved at room temperature on a vertical shaker in the course of 16 h to obtain a slightly cloudy, viscous solution having a solids content of 20% by weight.

Example 2

Producing a Porous Silicone Molding 10 g of solution from Example 1 are poured into a Teflon dish. As the isopropanol evaporates, the mixture solidifies and becomes slightly cloudy. Once isopropanol and NMP have evaporated in the course of 16 h, the porous silicone molding stays behind in a layer thickness of 500 μm.

The homogeneous and uniform distribution of the pores of the foils, about 10 μm in size, is distinctly apparent in a scanning electron microscope. The surfaces of the foils likewise reveal holes about 10 μm in size. Total porosity of the foil is about 60% by volume.

Example 3

Producing a Porous Silicone Molding 2 g of solution from Example 1 are poured into a Teflon dish. As the isopropanol evaporates, the mixture solidifies and becomes slightly cloudy. Once isopropanol and NMP have evaporated in the course of 16 h, the porous silicone molding stays behind in a layer thickness of 100 μm.

The homogeneous and uniform distribution of the pores in the foils, about 10 μm in size, is distinctly apparent in a scanning electron microscope. The surfaces of the foils likewise reveal holes about 10 μm in size. Total porosity of the foil is about 60% by volume.

Example 4

Producing a Casting Solution with a Higher Proportion of Isopropanol

To 24 g of isopropanol, boiling point 82° C. and 8 g of N-methyl-2-pyrrolidone (NMP), boiling point 203° C. are added 8 g of a polymer mixture consisting of 2 g of organopolysiloxane-polyurea copolymer (GENIOMER® 200) and 6 g of an organopolysiloxane-polyurea copolymer (SLM TPSE 100).

The entire batch is subsequently dissolved at room temperature on a vertical shaker in the course of 16 h to obtain a slightly cloudy, viscous solution having a solids content of 20% by weight.

Example 5

Producing a Porous Silicone Molding with Anisotropic Pore Structure 2 g of solution from Example 4 are poured into a Teflon dish. As the isopropanol evaporates, the mixture solidifies and becomes slightly cloudy. Once isopropanol and NMP have evaporated in the course of 16 h, the porous silicone molding stays behind in a layer thickness of 150 μm.

A scanning electron microscope reveals an anisotropic pore distribution. Pores of 10 μm are apparent on the underside of the molding, while there are no longer any pores visible on the surface of the foils. The cover layer has a thickness of about 20 μm. Total porosity of the foil is about 60% by volume.

Example 6

Producing a Casting Solution with Triethylene Glycol

To a solution consisting of 7.5 g of isopropanol and 2.5 g of a polymer mixture consisting of 0.625 g of organopolysiloxane-polyurea copolymer (GENIOMER® 200) and 1.875 g of an organopolysiloxane-polyurea copolymer (SLM TPSE 100) are added 3.0 g of triethylene glycol, boiling point 278° C.

The entire batch is subsequently dissolved at room temperature on a vertical shaker in the course of 2 h to obtain a slightly turbid, viscous solution having a solids content of 19% by weight.

Example 7

Producing a Porous Silicone Molding

A knife-drawing device (Coatmaster 509 MC-I, Erichsen) is used to produce a silicone molding from the knife-coating solution produced in Example 6.

The film-drawing frame used is a chamber-type coating knife with a film width of 11 cm and a gap height of 600 µm.

The glass plate used as substrate is fixed using a vacuum suction plate. Prior to knife application, the glass plate is wiped with a clean-room cloth soaked in ethanol. In this way, any particle impurities present are removed.

Thereafter, the film-drawing frame is filled with the solution and drawn over the glass plate at a constant film-drawing speed of 10 mm/s.

Thereafter, the still liquid wet film is air dried at 20° C. for about 30 min. Slight clouding of the film becomes apparent.

This molding, which still contains triethylene glycol, is placed in water for about 10 min to remove the triethylene glycol. Subsequently the molding is air dried for about 30 min.

An opaque membrane about 140 µm in thickness is obtained. The homogeneous and uniform distribution of pores about 10 µm in size is distinctly apparent in a scanning electron microscope. Holes about 10 µm in size are likewise apparent on the surfaces of the foils. Total porosity of the foil is about 60% by volume.

Example 8

Producing a Porous Silicone Molding with Larger Pores

A wet film is produced similarly to Example 5.

The still liquid wet film is subsequently covered with a glass dish and dried at 20° C. for about 60 min.

Slight clouding of the film becomes apparent.

This molding, which still contains triethylene glycol, is placed in water for about 10 min to remove the triethylene glycol from the molding. Subsequently the molding is air dried for about 30 min.

An opaque porous silicone molding about 140 µm in thickness is obtained. The homogeneous and uniform distribution of pores about 20 µm in size is distinctly apparent in a scanning electron microscope. Holes about 20 µm in size are likewise apparent on the surfaces of the foils. Total porosity of the foil is about 60% by volume.

Example 9

Comparative Example not in Accordance with the Present Invention

Producing Compact Films without Porosity

To produce compact films, 8 g of a polymer mixture consisting of 2 g of organopolysiloxane-polyurea copolymer (GENIOMER® 200) and 6 g of an organopolysiloxane-polyurea copolymer (SLM TPSE 100) are added to 32 g of isopropanol.

The entire batch is subsequently dissolved at room temperature on a vertical shaker in the course of 16 h to obtain a clear solution having a solids content of 20% by weight.

The film-drawing frame used is a chamber-type coating knife having a film width of 11 cm and a gap height of 300 µm.

The glass plate used as substrate is fixed using a vacuum suction plate. Prior to knife application, the glass plate is wiped with a clean-room cloth soaked in ethanol. In this way, any particle impurities present are removed.

Thereafter, the film-drawing frame is filled with the solution and drawn over the glass plate at a constant film-drawing speed of 25 mm/s.

Thereafter, the still liquid wet film is dried at 80° C. for about 3 h to obtain a transparent film having a layer thickness of 50 µm.

Testing of Moldings Produced

Gas Transport Properties of Moldings and Films Produced in Examples 5 and 9

The different samples are investigated for their different $N_2$ and $O_2$ gas permeabilities using a GPC gas permeability tester (Brugger). The results for the samples tested are summarized in table 1. The measurements are carried out at a constant gas flow of 100 cm$^3$/min and a constant measurement temperature of 20° C.

TABLE 1

Summary of samples tested

| Sample | $N_2$ permeability | $O_2$ permeability | $N_2/O_2$ selectivity |
|---|---|---|---|
| Ex. 5 | 1300 | 626 | 2.2 |
| Ex. 9 * | 195 | 87 | 2.2 | units: Barrer
* = not in accordance with the present invention

It is clearly apparent from table 1 that the permeabilities are distinctly higher owing to the anisotropic, porous construction of the inventive moldings from Example 5 in comparison with the Example 9 film produced from solid material. $N_2/O_2$ selectivity remains the same, however.

These properties make the moldings of the present invention distinctly more efficient than materials of the prior art.

Water Vapor Transport Properties of the Moldings and Film Produced in Examples 2, 4 and 9

The samples are tested with a LYSSY L80-5000 water vapor permeability tester (Lyssy AG, Zollikon) in respect of their water vapor transmission rate (test method DIN EN ISO 15106-1, test conditions T=23° C., RH=10-15%). The results are summarized in table 2.

TABLE 2

Summary of samples tested

| Sample | Water vapor transmission rate |
|---|---|
| Ex. 2 | 1700 |
| Ex. 3 | 2000 |
| Ex. 9 * | cannot be determined, too low |

* = not in accordance with the present invention
units: g d$^{-1}$ m$^{-2}$

It is clearly apparent from table 2 that the water vapor transmission rates are distinctly higher owing to the porous construction of the inventive moldings from Examples 2 and 3 in comparison with the Example 9 film produced from solid material.

These properties make the moldings of the present invention distinctly more efficient than materials of the prior art.

The invention claimed is:

1. A process for producing thin porous moldings comprising a silicone compound S, which comprises a copolymer of formula (III)

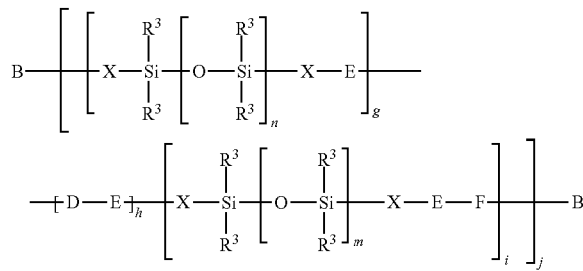

where the structural element E is one of the formulae (IVa), (IVc), (IVd) and/or (IVf)

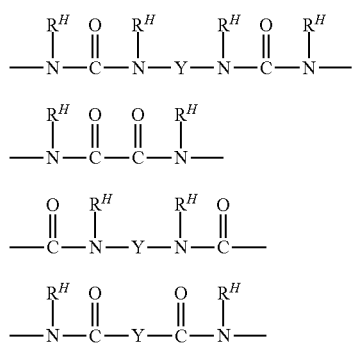

where the structural element F is one of formulae (Va), (Vc), (Vd) and/or (Vf)

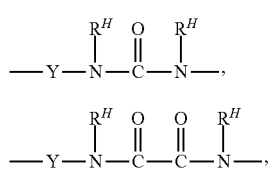

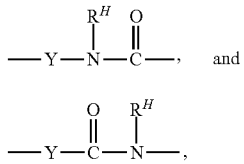

where
R each independently is a substituted or unsubstituted hydrocarbon moiety, optionally interrupted by oxygen or nitrogen atoms,
$R^3$ has the meaning of R,
$R^H$ is hydrogen or has the meaning of R,
X each independently is an alkylene moiety of 1 to 20 carbon atoms in which mutually nonadjacent methylene units are optionally replaced by —O— groups, or an arylene moiety of 6 to 22 carbon atoms,
Y each independently is a divalent, optionally fluorine- or chlorine-substituted hydrocarbon moiety of 1 to 20 carbon atoms,
D each independently is an alkylene moiety of 1 to 700 carbon atoms which is optionally substituted by fluorine, chlorine, $C_1$-$C_6$-alkyl or $C_1$-$C_6$-alkyl esters and in which mutually nonadjacent methylene units may be replaced by a group —O—, —COO—, —OCO—, or —OCOO—, or an arylene moiety of 6 to 22 carbon atoms,
B and B' are reactive or nonreactive end groups attached to the polymer by covalent bonding,
m represents an integer from 1 to 4000,
n is an integer from 1 to 4000,
g is an integer of at least 1,
h is an integer from 0 to 40,
i is an integer from 0 to 30, and
j is an integer greater than 0,
wherein the process comprises:
a) in a first step, preparing a solution or suspension comprising silicone compound S in a mixture comprising a solvent L1 and a solvent L2,
b) in a second step, introducing the solution or suspension into a mold,
c) in a third step, removing solvent L1 from the solution or suspension, reducing the solubility of silicone compound S in the mixture comprising solvent L1 and solvent L2 to form a phase A, rich in silicone compound S, and a phase B, lean in silicone compound S, effecting structure formation through phase A, and
d) in a fourth step, removing solvent L2 and residues of the solvent L1.

2. The process of claim 1, wherein the boiling point of solvent L1 at 1 bar is at least 30° lower than the boiling point of solvent L2 at one bar.

3. The process of claim 1, comprising removing solvent L1 from the molded solutions or suspensions in the third step, and solvent L2 in the fourth step by evaporation.

4. The process of claim 1, comprising removing solvent L2 and residues of solvent L1 from the molded solutions or suspensions in the fourth step by extracting with a further solvent.

5. The process of claim 1, wherein solvents L1 and L2 are mixed together prior to adding silicone compound S in step a).

6. The process of claim 1, wherein in step a), a solution is formed.

* * * * *